(12) United States Patent
Harris et al.

(10) Patent No.: US 9,889,421 B2
(45) Date of Patent: Feb. 13, 2018

(54) PROCESS FOR THE RECOVERY OF METALS AND HYDROCHLORIC ACID

(75) Inventors: Bryn Harris, Montreal (CA); Carl White, Gaspe (CA)

(73) Assignee: BRAV METAL TECHNOLOGIES INC., Montréal, Québec (CA)

( * ) Notice: Subject to any disclaimer, the term of this patent is extended or adjusted under 35 U.S.C. 154(b) by 0 days.

(21) Appl. No.: 13/579,864

(22) PCT Filed: Feb. 4, 2011

(86) PCT No.: PCT/CA2011/000141
§ 371 (c)(1),
(2), (4) Date: Nov. 5, 2012

(87) PCT Pub. No.: WO2011/100820
PCT Pub. Date: Aug. 25, 2011

(65) Prior Publication Data
US 2013/0052104 A1    Feb. 28, 2013

Related U.S. Application Data

(60) Provisional application No. 61/305,718, filed on Feb. 18, 2010, provisional application No. 61/420,500, filed on Dec. 7, 2010.

(51) Int. Cl.
*B01J 14/00* (2006.01)
*C01B 13/36* (2006.01)
(Continued)

(52) U.S. Cl.
CPC .............. *B01J 14/00* (2013.01); *C01B 7/035* (2013.01); *C01B 13/36* (2013.01); *C01F 5/30* (2013.01);
(Continued)

(58) Field of Classification Search
CPC .................. B01J 14/00; B01J 19/00108; B01J 2208/00761; B01J 2208/00796; C01B 3/36; C01B 7/07; C01G 49/06; C01G 1/02
(Continued)

(56) References Cited

U.S. PATENT DOCUMENTS 2,167,628 A    8/1939  Alessandroni
2,406,577 A    8/1946  Alessandroni et al.
(Continued)

FOREIGN PATENT DOCUMENTS

EP    0124213    11/1984
EP    0186370    2/1986
(Continued)

OTHER PUBLICATIONS

International Search Report for PCT/CA2011/000141, Completed by the Canadian Patent Office dated Apr. 28, 2011, 3 Pages.
(Continued)

*Primary Examiner* — Steven Bos
(74) *Attorney, Agent, or Firm* — Brooks Kushman P.C.

(57) ABSTRACT

A method for recovering hydrochloric acid and metal oxides from a chloride liquor is described. The method uses a chloride liquor including the metal and mixing the liquor and a matrix solution to produce a reaction mixture, wherein the matrix solution assists oxidation/hydrolysis of the metal with HCl production. In a preferred embodiment the matrix solution includes zinc chloride in various stages of hydration and an oxygen containing gas is added to the mix. A method where the improvement is the mixing of a liquor and a matrix solution where the solution assists hydrolysis of the metal with HCl production is also disclosed. The reactor is a column reactor in a preferred embodiment. Further disclosed is the method of using the matrix solution and a
(Continued)

reactor for recovering hydrochloric acid and for oxidizing/hydrolysis of a metal.

11 Claims, 12 Drawing Sheets

(51) Int. Cl.
*C01F 5/30* (2006.01)
*C01F 7/34* (2006.01)
*C01G 49/06* (2006.01)
*C01G 51/08* (2006.01)
*C01G 53/09* (2006.01)
*C01G 1/02* (2006.01)
*C01G 1/06* (2006.01)
*C01G 3/05* (2006.01)
*C01B 7/03* (2006.01)

(52) U.S. Cl.
CPC .............. *C01F 7/34* (2013.01); *C01G 1/02* (2013.01); *C01G 1/06* (2013.01); *C01G 3/05* (2013.01); *C01G 49/06* (2013.01); *C01G 51/085* (2013.01); *C01G 53/09* (2013.01); *B01J 2219/00006* (2013.01); *B01J 2219/00108* (2013.01)

(58) Field of Classification Search
USPC ........ 422/129, 139, 140; 123/138, 140, 488, 123/DIG. 1
See application file for complete search history.

(56) References Cited

U.S. PATENT DOCUMENTS

| | | | |
|---|---|---|---|
| 3,202,524 A | 8/1965 | Richmond | |
| 3,236,596 A | 2/1966 | Duisburg et al. | |
| 3,238,038 A | 3/1966 | Hunter | |
| 3,669,623 A * | 6/1972 | Allison et al. | 423/488 |
| 3,682,592 A | 8/1972 | Kovacs | |
| 3,764,650 A | 10/1973 | Scheiner et al. | |
| 3,903,239 A | 9/1975 | Berkovich | |
| 4,058,393 A | 11/1977 | McLaughlin | |
| 4,551,213 A | 11/1985 | Wilson | |
| 4,878,945 A | 11/1989 | Raudsepp et al. | |
| 5,028,260 A | 7/1991 | Harris et al. | |
| 5,364,444 A | 11/1994 | McDoulett, Jr. et al. | |
| 5,980,850 A * | 11/1999 | Lebl | 423/394.2 |
| 6,315,812 B1 | 11/2001 | Fleming et al. | |
| 6,375,923 B1 | 4/2002 | Duyvesteyn et al. | |
| 6,500,396 B1 | 12/2002 | Lakshmanan et al. | |
| 7,166,145 B1 | 1/2007 | Han | |
| 7,513,931 B2 | 4/2009 | Thomas | |
| 7,803,336 B2 | 9/2010 | Lakshmanan et al. | |
| 7,858,056 B2 | 12/2010 | Moyes et al. | |
| 2001/0007646 A1 | 7/2001 | Lakshmanan et al. | |
| 2005/0066774 A1 | 3/2005 | Asano et al. | |
| 2006/0144191 A1 | 7/2006 | Shapovalov et al. | |
| 2009/0241735 A1 | 10/2009 | Abe et al. | |
| 2010/0058893 A1 | 3/2010 | Zontov | |
| 2011/0158869 A1 | 6/2011 | Takahashi et al. | |

FOREIGN PATENT DOCUMENTS

| | | | |
|---|---|---|---|
| JP | S59118819 | | 7/1984 |
| JP | H026331 | | 1/1990 |
| JP | H04293741 | | 10/1992 |
| JP | 2004-137118 | * | 5/2004 |
| JP | 2006176353 | | 7/2006 |
| WO | 9511319 | | 4/1995 |
| WO | 0208477 | | 1/2002 |
| WO | 2004059018 | | 7/2004 |
| WO | 2004087970 | | 10/2004 |
| WO | 2006113284 | | 10/2006 |
| WO | 2007071020 | | 6/2007 |
| WO | 2009153321 | | 12/2009 |

OTHER PUBLICATIONS

Demopoulos et al, World of Metallurgy 2008, vol. 61, No. 2, p. 89-98, "New Technologies for HCl Regeneration in Chloride Hydrometallurgy."

* cited by examiner

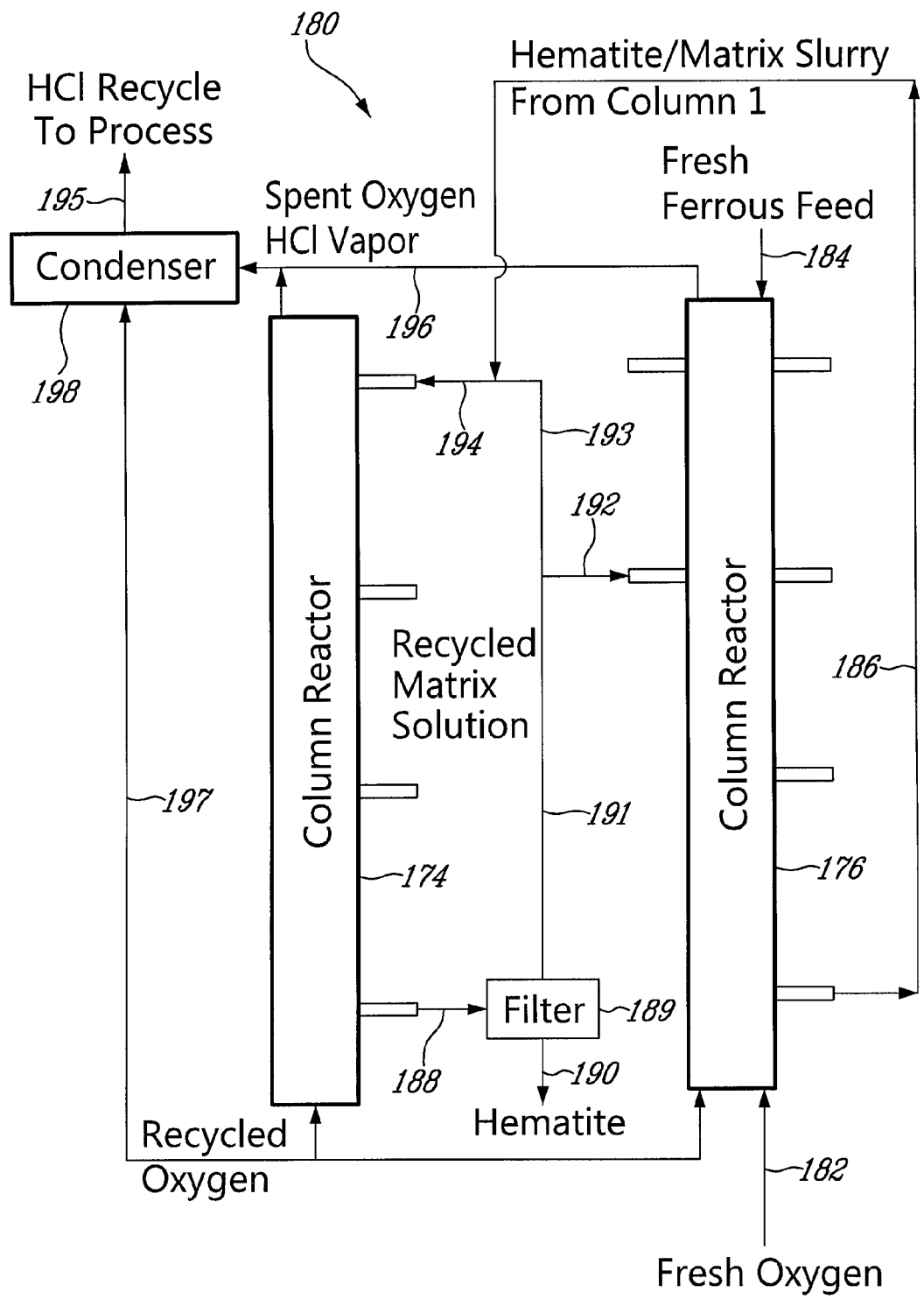

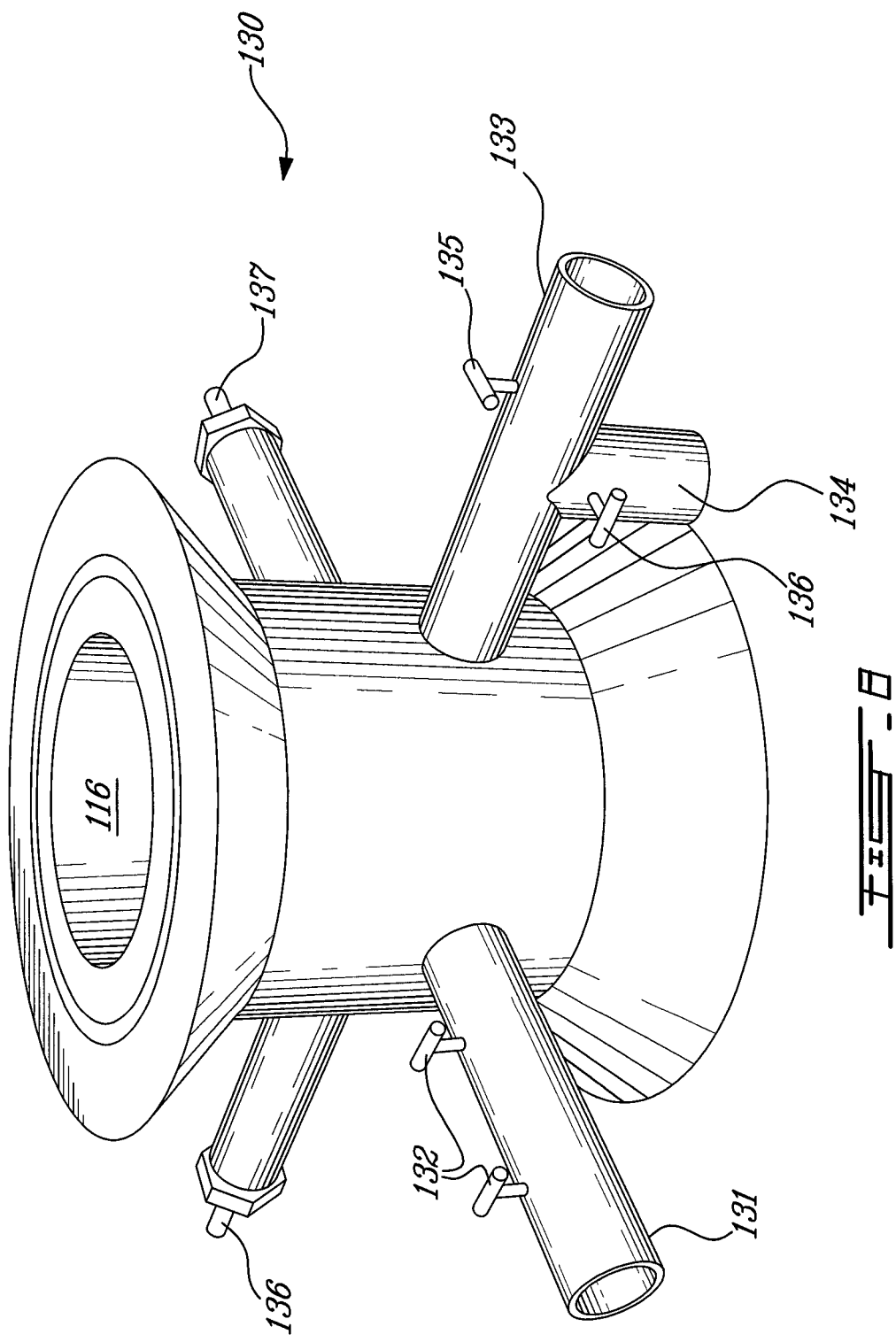

PROCESS FOR THE RECOVERY OF METALS AND HYDROCHLORIC ACID

CROSS-REFERENCE TO RELATED APPLICATION

This application is the U.S. national phase of PCT Appln. No. PCT/CA2011/000141 filed on Feb. 4, 2011, which claims the benefit of U.S. Patent Provisional Application No. 61/305,718 filed on Feb. 18, 2010 and U.S. Patent Provisional Application No. 61/420,500 filed on Dec. 7, 2010, the disclosures of which are incorporated in their entirety by reference herein.

FIELD OF THE INVENTION

The present invention relates to processes for the recovery of metals and ore processing, and hydrochloric acid that is recovered for recycle within the process. The processes also relate to the simultaneous oxidation and precipitation of ferrous iron as hematite, and to the recovery and recycle of the associated acid within the process. More specifically, the process relates to the oxidation of ferrous chloride and recovery of hydrochloric acid. It further relates to a novel reactor for effecting these reactions.

BACKGROUND OF THE INVENTION

Various hydrometallurgical techniques have been developed for recovering metals such as zinc, nickel, copper, cobalt, lead, aluminum, titanium, and magnesium from sulfide and oxide ores, concentrates and intermediates. One such technique involves leaching the ore with a lixiviant that promotes dissolution of one or more metals into the leaching solution. Various compounds have been used individually as leaching agents in the lixiviant, for instance, sulfuric acid, hydrochloric acid, nitric acid, ferric chloride, ferric sulfate, cupric chloride and magnesium chloride. Recently there has been much work in the area of chloride-based leaching processes. All of these techniques inevitably involve the dissolution of iron, which then has to be removed from the system in order to facilitate the recovery of the value metals.

Iron is and has always been considered a major problem in hydrometallurgical processes such as those referred to above. In atmospheric processes, the iron is usually precipitated as an oxy-hydroxide, and in higher temperature autoclave processes, as an impure hematite. Often, small amounts of copper are added to act as a catalyst in the oxidation of ferrous to ferric. A more acceptable method of controlling iron is to form FeOOH, either β-FeOOH (akaganéite) or α-FeOOH (goethite) as described by D. Filippou and Y. Choi, "A Contribution to the Study of Iron Removal From Chloride Leach Solutions", in *Chloride Metallurgy 2002* Volume 2, (E. Peek and G. van Weert, Editors), Proceedings of the $32^{nd}$ Annual CIM Hydrometallurgical Conference, CIM, Montreal (2002), p. 729. This approach is based to some extent on a controlled supersaturation precipitation technique, and is more efficient than, for example, the turboaeration process proposed by Great Central Mines in their chloride copper process, as described by R. Raudsepp and M. J. V. Beattie, "Iron Control in Chloride Systems", in *Iron Control in Hydrometallurgy* (J. E. Dutrizac and A. J. Monhemius, Editors), Proceedings of $16^{th}$ Annual CIM Hydrometallurgical Meeting, Toronto, October 1986, CIM Montreal (1996), p. 163.

Ferrous chloride solution, containing minor amounts of steel alloys such as manganese, vanadium and nickel, is the principal by-product of steel pickling lines (commonly referred to as waste pickle liquor, "WPL"). This solution is generally treated by a process called pyrohydrolysis, where the solution is injected into hot combustion gases at 700-900° C., causing oxidation of the ferrous iron to ferric and subsequent decomposition to recover hydrochloric acid and generate an iron oxide product for disposal or sale. The strength of the hydrochloric acid recovered from this process is limited to 18% because the off-gases have to be quenched in water, and using this method it is impossible to exceed the azeotropic concentration of hydrochloric acid in water, 20.4%.

The background to the present application has been largely covered in World Intellectual Property Organization International Publication Number WO2007/071020, Jun. 28, 2007 of Harris and White, which describes a process for the recovery of iron as hematite from a sulfide ore or concentrate. The process of Harris and White teaches a method for recovering iron as hematite from ferric chloride solutions containing a background chloride, preferably magnesium chloride, comprising heating the solution to 220-250° C. and adding water or steam to cause the precipitation of hematite and recovery of HCl.

U.S. Pat. No. 3,682,592 issued to Kovacs describes a process, the PORI Process, for recovering HCl gas and ferric oxide from waste hydrochloric acid steel mill pickle liquors (WPL). WPL typically contains water, 18 to 25% weight of ferrous chloride ($FeCl_2$), less than 1% weight ferric chloride ($FeCl_3$), small amounts of free hydrochloric acid and small amounts of organic inhibitors. The process of Kovacs includes two steps namely, a first oxidation step and a second thermal decomposition step. During the first oxidation step, the ferrous chloride in the WPL is oxidized using free oxygen to obtain ferric oxide and an aqueous solution containing ferric chloride. No hydrochloric acid is liberated at this stage. The first oxidation step is carried out under pressure (preferably, 100 p.s.i.g.) and at an elevated temperature (preferably, 150° C.), and therefore requires an autoclave.

During the second step, the resultant ferric chloride solution is thermally decomposed to obtain ferric oxide and HCl gas, which is recovered as hydrochloric acid. More specifically, the resultant solution is heated up to 175-180° C. at atmospheric pressure, and hydrolysis effected by the water in the fresh ferric chloride being added. The HCl is stripped off at a concentration of 30% with >99% recovery and good quality hematite is produced. While recovery of hydrochloric acid and hematite may be achieved using this process, its application tends to be limited to liquors containing only ferrous/ferric chlorides. When other chlorides are present in the solution, for instance and especially magnesium chloride as in the process of Harris and White, the activity of the chloride ions and protons tends to be too high to permit any reaction to take place simply by heating the solution to the temperature specified by Kovacs. Accordingly, this process tends not to be well adapted for use in leaching processes involving chlorides other than ferric chloride.

Applicant has found that the process of Harris and White will work in the laboratory in batch mode, but not in a continuous mode, because as the background chloride, e.g. magnesium chloride, calcium chloride, sodium chloride, aluminum chloride or base metal chlorides, concentration increases relative to that of iron, then the solution freezes, and is a solid at the temperatures indicated by Harris and White, and in some cases at the temperature indicated by Kovacs. This is true once the concentration of other chlorides reaches approximately 30% of the total in addition to ferric chloride. Accordingly, the processes of Harris and White and of Kovacs are impossible to operate if there are significant concentrations of other metal chlorides present in the solution.

SMS Siemag of Vienna, Austria, published a paper describing a process almost identical to that of Kovacs. The paper, Regeneração Hidrotérmica De Ácido Um Modo Econômico De Regenerar Líquidos De Decapagem E Produzir Óxidos Férricos De Alta Qualidade, published in Portuguese by Vogel, et al., follows the same procedures as Kovacs. More recently, a patent application describing the SMS Siemag process has been published by N. Takahashi et al., entitled Processing Method for Recovering Iron Oxide and Hydrochloric Acid, International Patent Application WO2009153321A1, Dec. 23, 2009. In the flowsheet published in the paper and patent application, the feed solution contains base metals such as manganese, and when this builds up, the liquid phase has to be discarded. This can be seen from FIG. 1 in the paper by Vogel et al. This is also similar to the observation noted by applicant in trying to reproduce the process of Harris and White.

In light of the foregoing, it would be advantageous to be able to both oxidise and hydrolyse ferrous iron in a single process, generating a high-strength stream of hydrochloric acid. Further, this hydrochloric acid may be used for recycle or re-use within the overall flowsheet, as well as a pure hematite product.

SUMMARY OF THE INVENTION

In accordance with a broad aspect of the present invention, a process for recovering hydrochloric acid and useful metal oxidic materials from any chloride-based feed solution. Such solution may have been generated by treating any base or light metal-containing material with any lixiviant comprising acid and a chloride, but in particular with hydrochloric acid generated and recycled within the process, or WPL. The chloride solution is then treated to separate and recover therefrom hydrochloric acid and metal oxides as products of high purity.

In accordance with one aspect of the present invention, there is provided a method for recovering hydrochloric acid and metal from a chloride liquor comprising: providing the chloride liquor comprising the metal; and mixing the liquor and a matrix solution to produce a reaction mixture, wherein the matrix solution assists hydrolysis of the metal with HCl production.

In accordance with another aspect of the present invention, there is provided the method described herein, further comprising mixing an oxygen containing gas into the mixture.

In accordance with yet another aspect of the present invention, there is provided the method described herein, wherein the matrix solution comprises $ZnCl_2$.

In accordance with still another aspect of the present invention, there is provided the method described herein, wherein the hydrolyzed metal is removed from the matrix solution by a solid/liquid separator.

In accordance with yet still another aspect of the present invention, there is provided the method described herein, wherein the chloride liquor comprises base and light metals that are dissolved in the reaction mixture, the method further comprising at least one step of base metal removal from solution or hydrolysis solid/liquid separation.

In accordance with a further aspect of the present invention, there is provided a method of recovering hydrochloric acid and metal from a chloride liquor wherein the improvement comprises injecting the liquor into a matrix solution to produce a reaction mixture, wherein the solution assists hydrolysis of the metal in the reaction mixture and produces HCl.

In accordance with yet a further aspect of the present invention, there is provided the method described herein wherein an oxygen containing gas is injected into the reaction mixture.

In accordance with still a further aspect of the present invention, there is provided the method described herein, wherein the matrix solution comprises $ZnCl_2$.

In accordance with yet still a further aspect of the present invention, there is provided a use of a matrix solution for recovering hydrochloric acid and metal oxide from a metal containing chloride liquor, the use comprising: mixing the liquor and a matrix solution to produce a reaction mixture, wherein the matrix solution assists hydrolysis and oxidation of the metal with HCl production.

In accordance with one embodiment of the present invention, there is provided the use described herein, wherein an oxygen containing gas is injected into the mixture.

In accordance with another embodiment of the present invention, there is provided the use described herein, wherein the matrix solution comprises $ZnCl_2$.

In accordance with yet another embodiment of the present invention, there is provided a reactor for recovering hydrochloric acid and for oxidation/hydrolysis of metal from metal chloride solution, the reactor comprising a tank compatible with a mixture comprising the metal chloride solution, a matrix solution, an oxygen containing gas and a solid comprising a metal oxide, the tank comprising a base, the base defining a first diameter and a first cross sectional area, the base comprising a metal oxide slurry outlet, a matrix solution outlet and a gas inlet; a top opposite the base, the top comprising a solution inlet, a hydrochloric acid outlet, a matrix solution inlet, the top defining gas an expansion zone having a second cross sectional area and, a wall attached to the top and the base defining a volume and a height of the tank; wherein a ratio of the second cross sectional area to the first cross sectional area is greater than 1 and whereby the hydrochloric acid leaves the mixture as a hydrochloric acid containing gas in the gas expansion zone at the top of the tank.

In accordance with still another embodiment of the present invention, there is provided the reactor described herein, wherein the reactor is a column reactor.

In accordance with yet still another embodiment of the present invention, there is provided the reactor described herein, comprising a ratio of the height to the first diameter from 5:1 to 20:1.

In accordance with a further embodiment of the present invention, there is provided a process for recovering hydrochloric acid and oxidation/hydrolysis of ferrous iron from a ferrous chloride solution, the process comprising providing a ferrous chloride solution, mixing the solution and a matrix solution together to produce a mixture, wherein the matrix solution comprises a metal chloride, and injecting an oxygen containing gas into the mixture, to oxygenate the matrix.

In accordance with yet a further embodiment of the present invention, there is provided the process described herein, wherein the metal chloride is $ZnCl_2$.

It is an aspect of the invention to provide a single method which permits the recovery of iron, hydrochloric acid and base or light metals. Rather than heating said chloride solution to high temperatures which causes the iron to hydrolyse as described in the processes of the prior art, it has been discovered that this can be achieved by adding/mixing/ injecting the solution into a matrix solution to produce a reaction mixture at 130-230° C., preferably 160-180° C., wherein the iron hydrolyses and precipitates as hematite with simultaneous recovery of hydrochloric acid which distils off and is collected in an off-gas system to be recycled to the leaching stage.

It is a further aspect that any base or light metals present in the initial solution are dissolved into the matrix solution. Thus, there is an immediate recovery of iron and hydrochloric acid, and an immediate and effective separation of iron from the other metal chlorides in solution. The matrix solution may be any compound which is inert and liquid at temperatures up to 250° C., and which will also act as a solvent for the base and light metals. In practice, there are very few such materials. Applicant has identified one as being zinc chloride, and accordingly, this is the preferred matrix. However, it is understood that there may be other such matrices. Zinc chloride is preferred since it is a chloride salt, and therefore introduces no additional ions into solution, and may be used together or with other materials in solution or suspension.

The matrix solution remains fluid at such temperatures, and the hematite solids are removed by any suitable separation device, for example hot vacuum or pressure filtration.

The matrix solution is substantially inert, and likely acts as a catalyst to accelerate the numerous possible hydrolysis reactions, therefore is a matrix for the various reactions. The $ZnCl_2$ solution is generally a molten salt hydrate, e.g. $ZnCl_2.2H_2O$ in a liquid state and in various states of hydration $ZnCl_2.2H_2O$ to $ZnCl_2.5H_2O$ depending on the temperature.

Additional heating of the iron-free matrix solution to 180-200° C. and injecting steam or water causes the base metals, but not aluminum and magnesium, to hydrolyse and precipitate as basic chlorides, with a generic formula of $Me(OH)_2.MeOHCl$, where Me represents for example Cu, Ni or Co. Equivalent hydrochloric acid is recovered in manner similar to that recovered from iron hydrolysis. Therefore it is clear that the use of the matrix would allow for the recovery of metal and HCl.

These basic chlorides may be separated from the matrix by any suitable separation device and redissolved in dilute hydrochloric acid, the resulting solution from which can be treated by standard methods known in the industry for the recovery of the metal(s), such as, but not limited to, ion exchange, solvent extraction or electrowinning.

Alternatively, the basic chlorides are amenable to low temperature calcination (200-400° C., depending on the particular metal), to generate the metal oxide, and recover the associated chloride as hydrochloric acid.

It has been found that copper will hydrolyse before nickel and cobalt, and may therefore be separated preferentially.

Further heating of the matrix solution to 200-230° C. and injecting additional water or steam promotes the hydrolysis and precipitation of both aluminum and magnesium as basic chlorides.

In an alternative aspect of the invention, individual metal chloride solutions may be directly added to or injected into the matrix to recover the metal oxide or basic chloride and the associated hydrochloric acid without the addition of any extra water or steam.

In a further embodiment of the process, ferrous iron chloride, such as might be present in a steel pickling liquor or from the leaching of a base metal sulfide ore, may be injected on its own, or simultaneously with ferric iron chloride, along with oxygen or an oxygen containing gas, such as air, into the matrix solution at a temperature of 109-190° C., preferably 130-160° C., and more preferably at 140-150° C. It has been discovered that the ferrous iron will oxidise under these conditions, and that if the temperature is then raised to 170-180° C., hematite will precipitate. Thus, oxidation and hydrolysis may be achieved by the use of a matrix solution in a single vessel, and advantageously without recourse to an autoclave as described in the processes of the prior art.

In accordance with another aspect of the present invention, there is a provided a reactor for recovering hydrochloric acid and for oxidation/hydrolysis of ferrous iron from a ferrous chloride solution, the reactor comprising a tank compatible with a mixture comprising the ferrous chloride solution, a matrix solution, an oxygen containing gas and a solid comprising hematite, the tank comprising a base, the base defining a first cross sectional area, the base comprising a hematite slurry outlet, a matrix solution outlet and a gas inlet; a top opposite the base, the top comprising a solution inlet, a hydrochloric acid outlet, a matrix solution inlet, the top defining gas an expansion zone having a second cross sectional area and, a wall attached to the top and the base defining a volume of the tank; wherein a ratio of the second cross sectional area to the first cross sectional area is greater than 1 and whereby the hydrochloric acid leaves the mixture as a hydrochloric acid containing gas in the gas expansion zone at the top of the tank.

In accordance with yet another aspect of the present invention there is provided a process for recovering hydrochloric acid and oxidation/hydrolysis of ferrous iron from a ferrous chloride solution, the process comprising providing a ferrous chloride solution, mixing the solution and a matrix solution together to produce a mixture, wherein the matrix solution comprises a metal chloride, and injecting an oxygen containing gas into the mixture, to oxygenate the matrix.

BRIEF DESCRIPTION OF THE DRAWINGS

Reference will now be made to the accompanying drawings, showing by way of illustration a particular embodiment of the present invention and in which:

FIG. 5 is a flowsheet of operation of two column reactors in series according to a further embodiment of the present invention;

FIG. 6 is a perspective view of a column reactor in accordance with one embodiment of the invention;

DETAILED DESCRIPTION OF EMBODIMENTS OF THE INVENTION

Figure 1:
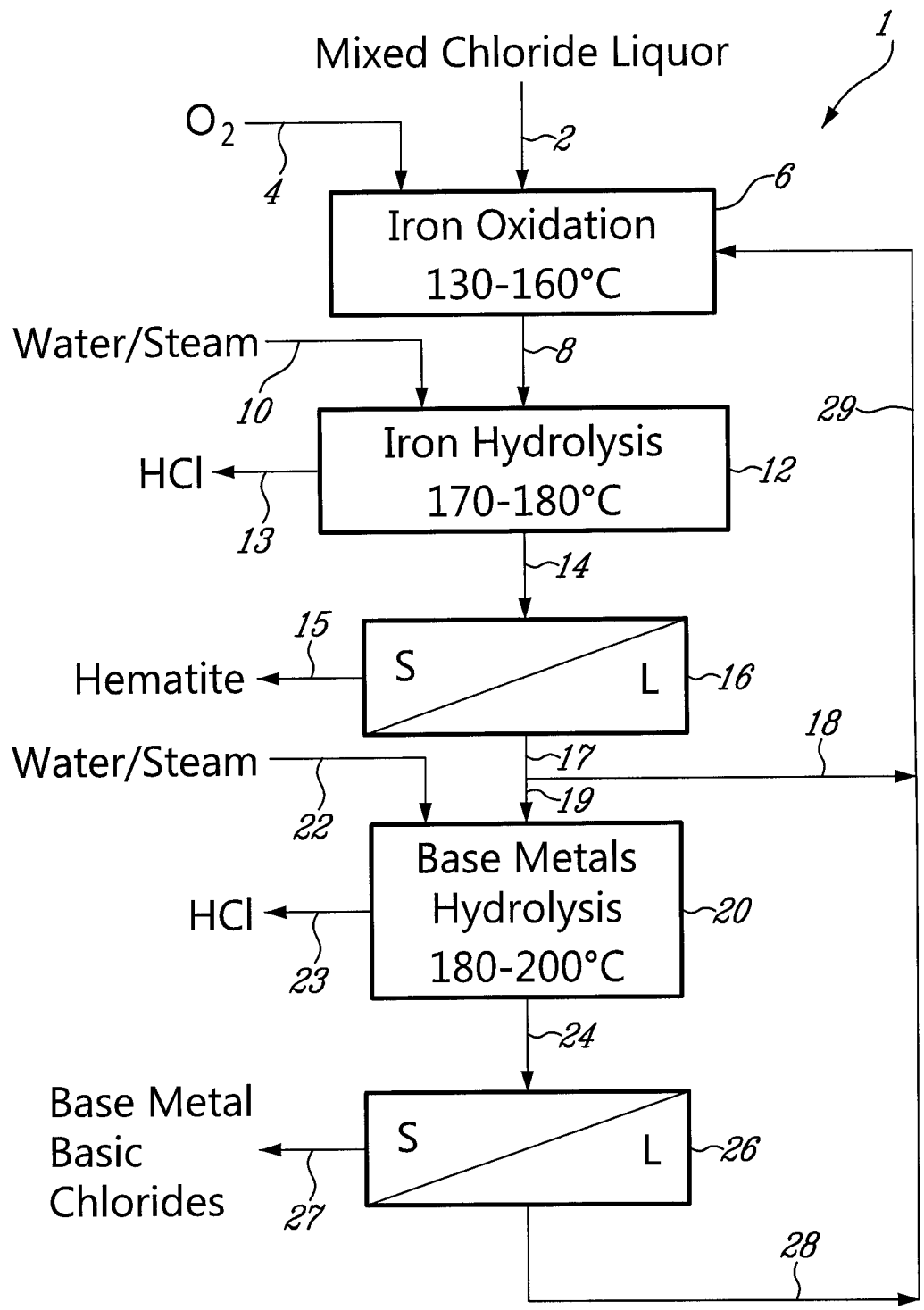
FIG. 1 illustrates a block diagram of a process for recovering HCl and base metals from a mixed chloride liquor according to one embodiment of the present invention.

The embodiments of the present invention shall be more clearly understood with reference to the following detailed description taken in conjunction with the accompanying drawings.

A matrix solution is used in the present process, and may be any compound which is capable of being oxygenated to form, even transiently, a hypochlorite compound, and which remains liquid at temperatures up to at least 190° C. and preferably to 250° C. It is also preferable that said matrix solution will act as a solvent for any base and light metals which might be present in the feed ferrous iron solution. In practice, there are very few such materials. Zinc chloride is a preferred matrix. Other such compounds are calcium chloride and magnesium chloride, and it is understood that there may be other such matrices alone or in combination. In this application, particularly where the feed is ferrous chloride, zinc chloride is preferred since it is both a chloride salt and remains liquid to a temperature >250° C. In a nitrate medium, suitable matrices may be silver nitrate and zinc nitrate.

The matrix solution remains fluid at such temperatures, and the hematite solids are removed by any suitable separation device, for example hot vacuum or pressure filtration.

The matrix solution is substantially inert, but acts as a catalyst for oxygen transfer to accelerate the oxidation and hydrolysis reactions. The matrix solution is generally a molten salt hydrate, e.g. $ZnCl_2.2H_2O$ in a liquid state and in various states of hydration $ZnCl_2.2H_2O$ to $ZnCl_2.5H_2O$ depending on the temperature.

With regard to nomenclature, the term "ferrous chloride solution" applies to any metal chloride solution containing ferrous iron however derived, whether, for example, from an ore or concentrate leaching process, or from, for example, a steel mill pickling process.

The definition of a base metal is understood as a non-ferrous metal but excluding the precious metals (Au, Ag, Pt, Pd, etc.)

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts and/or steps are marked throughout the specification and the drawings with the same respective reference numerals.

Referring to FIG. 1, there is shown a schematic representation of a process 1 in accordance with an embodiment of the invention. Broadly speaking, the process involves the recovery of iron material, base metal materials and hydrochloric acid from a chloride-based feed solution/liquor 2 containing ferrous iron, ferric iron and base metals, such as might be derived from: a steel pickling process; the leaching of a base metals sulfide ore, or refractory gold ore. The method is conducted in an inert matrix solution according to one embodiment of the present invention, the method steps comprising: an iron oxidation 6 from the liquor 2 including base metals (Cu, Ni, Co, Pb etc.), iron hydrolysis 12 with HCl removal 13 and hematite production, solid/liquid separation 16 of the hematite 15, a hydrolysis of base metals 20 with a further HCl recovery 23 and base metal separation 26, and recycle of the inert matrix solution 28.

The mixed chloride liquor feed solution 2 is added and mixed into the matrix solution together with air or oxygen 4 at 130-160° C. to produce a reaction mixture. Any ferrous iron may be oxidized by and subsequently hydrolysed 12 by water 10 at 170-180° C. to form hematite according to the following chemical reactions with HCl 13 produced:

$$12FeCl_2 + 3O_2 \rightarrow 2Fe_2O_3 + 8FeCl_3 \qquad \text{I}$$

$$4FeCl_2 + O_2 + 4H_2O \rightarrow 2Fe_2O_3 + 8HCl \qquad \text{II}$$

$$2FeCl_3 + 3H_2O \rightarrow Fe_2O_3 + 6HCl \qquad \text{III}$$

Therefore the reaction mixture 8 includes: the liquor solution, the matrix solution, the precipitating metal solids, any dissolved solids, unreacted oxygen and HCl. Whilst air can be used to effect the oxidation, its use is not recommended, unless sub-azeotropic (<20% HCl) hydrochloric acid is acceptable to the overall process. This is because the large quantity of nitrogen present in air requires the addition of water to scrub the hydrochloric acid liberated into the off-gas system.

FIG. 1 shows separate iron oxidation 6 and iron hydrolysis/precipitation 12 steps, but these may be combined into a single step at the higher temperature of 170-180° C.

Following the hydrolysis/precipitation 12 step, the remaining solution 14/reaction mixture (now an iron-depleted matrix chloride liquor) including the hematite product 15 are then subjected to a solid/liquid separation step 16. The hematite product thus recovered may be dried and sold, or simply disposed of.

Sulfates may be present in the chloride feed solution, especially if such solution derives from the leaching of base metal sulfide or refractory gold ores. Normally, the precipitation of jarosites might be expected from the combination of ferric iron, sulfate and high temperatures, as is widely practiced in the zinc processing industry. However, sulfates have been shown to have no impact at all on said iron precipitation process, and remain in the solution phase. If desired, sulfates may be removed by precipitation as calcium sulfate (gypsum, hemihydrate or anhydrite) by the addition of calcium ions at any point in the flowsheet.

Once the iron has been removed (via stream 15), most of the base metal-rich matrix solution 17 is simply recycled 18 in order to build up the concentration of base metals, and a bleed 19 can be hydrolyzed 20 by heating to 180-200° C., more preferably 185-190° C., and water or steam injection 22. This causes the base metals to precipitate as the basic chlorides and HCl 23 to be produced, according to the equations below, where Me represents, for example, copper, nickel or cobalt:

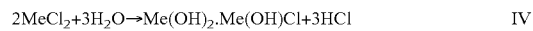
$$2MeCl_2 + 3H_2O \rightarrow Me(OH)_2.Me(OH)Cl + 3HCl \qquad \text{IV}$$

The basic chlorides 24 may be separated 26 by any suitable separation device. The diagram shows the base metal basic chlorides 27 precipitating and being separated together, but it has been found in practice that copper, nickel and cobalt may be individually recovered, or redissolved, separated and recovered by any method known in the art such ion exchange, solvent or electrowinning. The remaining liquor 28 from solid/liquid separation 26 may be recycled 28, and even combined with other recycles 48, and returned to the top of the process 1.

Figure 2:
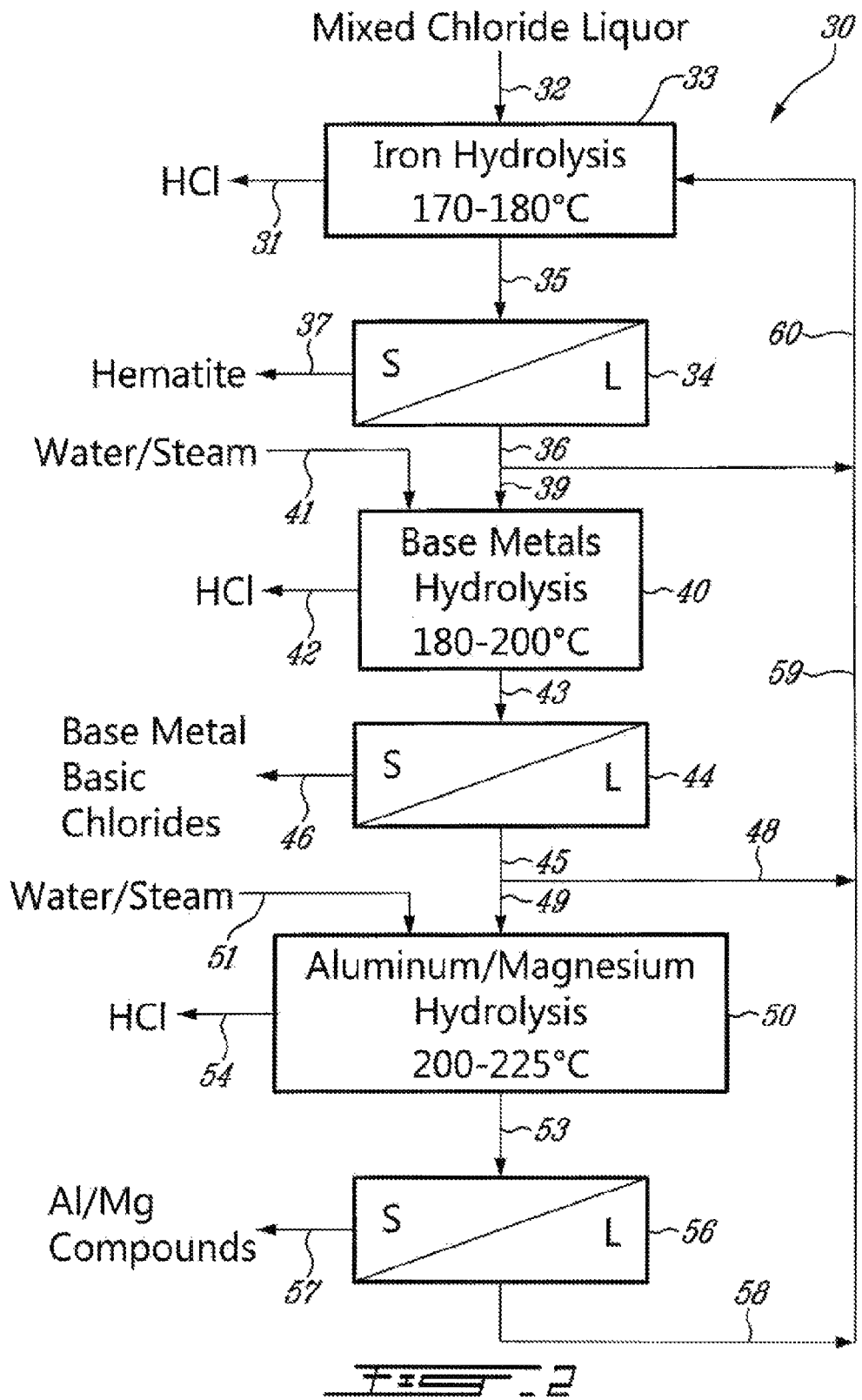
FIG. 2 illustrates a block diagram of a process for recovering HCl and base metals from a mixed chloride liquor according to another embodiment of the present invention, where the liquor includes ferric chloride and the process includes an inert matrix solution and no iron oxidation step.

The process 30 in FIG. 2 comprises: iron hydrolysis 33 from the liquor that includes base metals (Cu, Ni, Co, Pb etc.) and lighter metals (Mg, Al, etc) with HCl 31 removal and hematite 37 production, solid/liquid separation 34 of hematite, a hydrolysis 40 of base metals with further HCl recovery 42 and base metal separation 44, a hydrolysis of light metals 50 with yet a further HCl recovery 54 and light metal separation 56, and recycle 58 of the inert matrix solution. In process 30, a separate embodiment is shown with a ferric chloride solution containing base metals, aluminum chloride and magnesium chloride, such as might be derived from the leaching of a nickel laterite ore or an aluminum ore such as bauxite. In this embodiment, the chloride solution is injected into the matrix solution at 170-180° C. to effect the hydrolysis of ferric chloride and precipitation of hematite as in the reaction III with the production of HCl 34. The hematite may be separated from the matrix solution by any appropriate separation device 34.

Once the iron has been removed, most of the base metal, aluminum and magnesium-rich matrix solution 36 is simply recycled 38 in order to build up the concentration of these metals, and a bleed 39 can be heated to 180-200° C., more preferably 185-190° C., and water or steam 41 injected. This causes the base metals to precipitate as the basic chlorides, according to the reaction IV.

The basic chlorides 43 may be separated by any suitable separation device 44. The diagram shows the base metal basic chlorides 46 precipitating together, but it has been found in practice that copper, nickel and cobalt may be individually recovered, or redissolved, separated and recovered by any method known in the art such ion exchange, solvent or electrowinning.

The remaining matrix solution 45 will contain aluminum and magnesium chlorides. These may be precipitated together, or aluminum may be preferentially precipitated as a pseudo-boehmite compound, by heating the solution to 200-220° C. Once again, a recycle 48 may be used to increase Al/Mg solution concentration.

Heating the solution 49 to 220-225° C. will effect the precipitation 50 of both aluminum and magnesium, according to the following reactions using water and/or steam 51 and with HCl 54 produced:

$$AlCl_3 + 2H_2O \rightarrow AlOOH + 3HCl \qquad \text{V}$$

$$MgCl_2 + H_2O \rightarrow Mg(OH)Cl + HCl \qquad \text{VI}$$

The aluminum and magnesium compounds 57 may be separated 58 from solution 53 leaving hydrolysis by any appropriate separation 56 device, washed and dried, and the matrix solution is recycled to the head of the circuit.

Figure 3A:
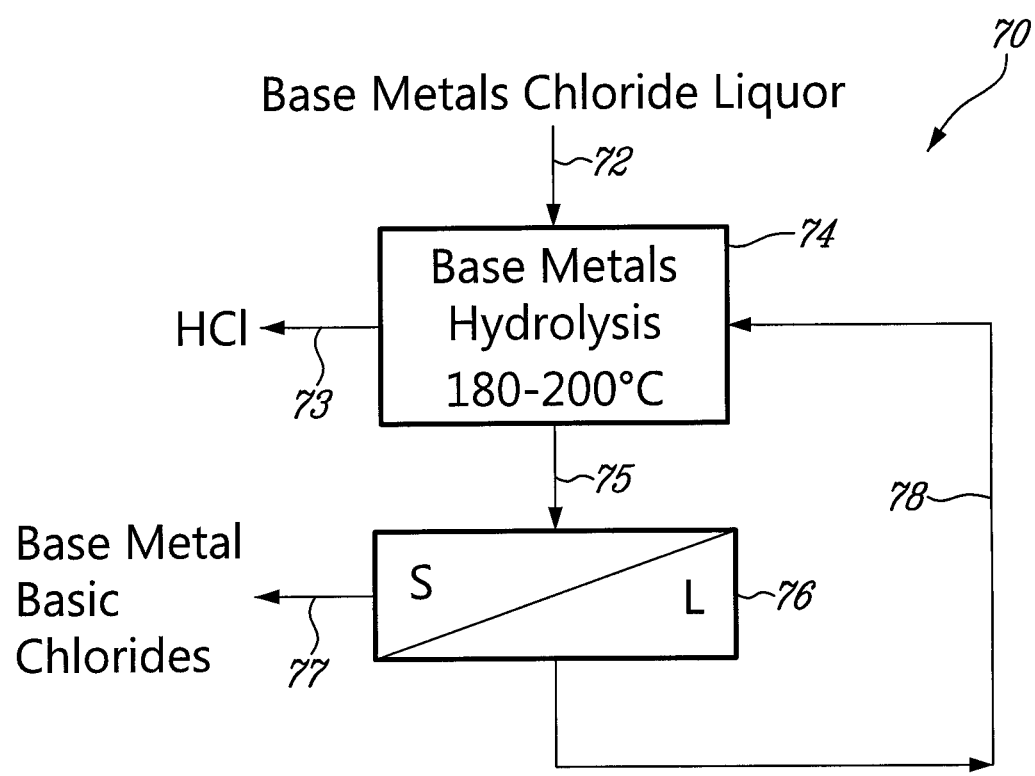
FIG. 3A illustrates a block diagram of a process for recovering HCl and base metals from a mixed base metals chloride liquor, the method conducted in an inert matrix solution according to yet another embodiment of the present invention.
Figure 3B:
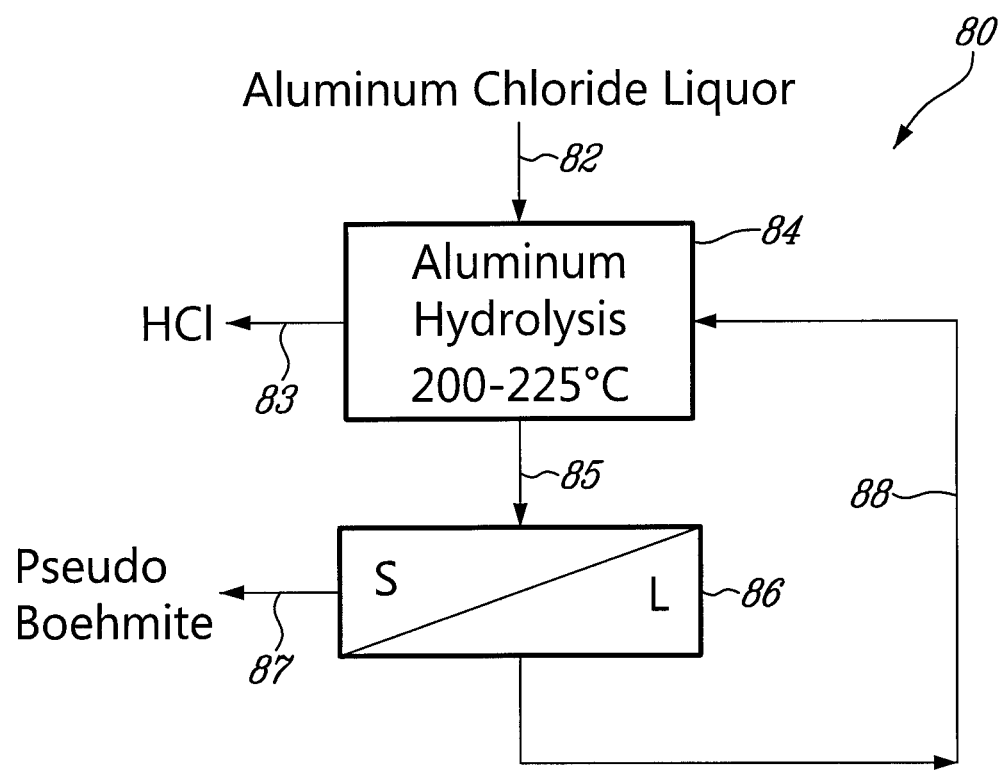
FIG. 3B illustrates a block diagram of a process for recovering HCl and light metal from an aluminum chloride liquor, the method conducted in an inert matrix solution according to a further embodiment of the present invention.
Figure 3C:
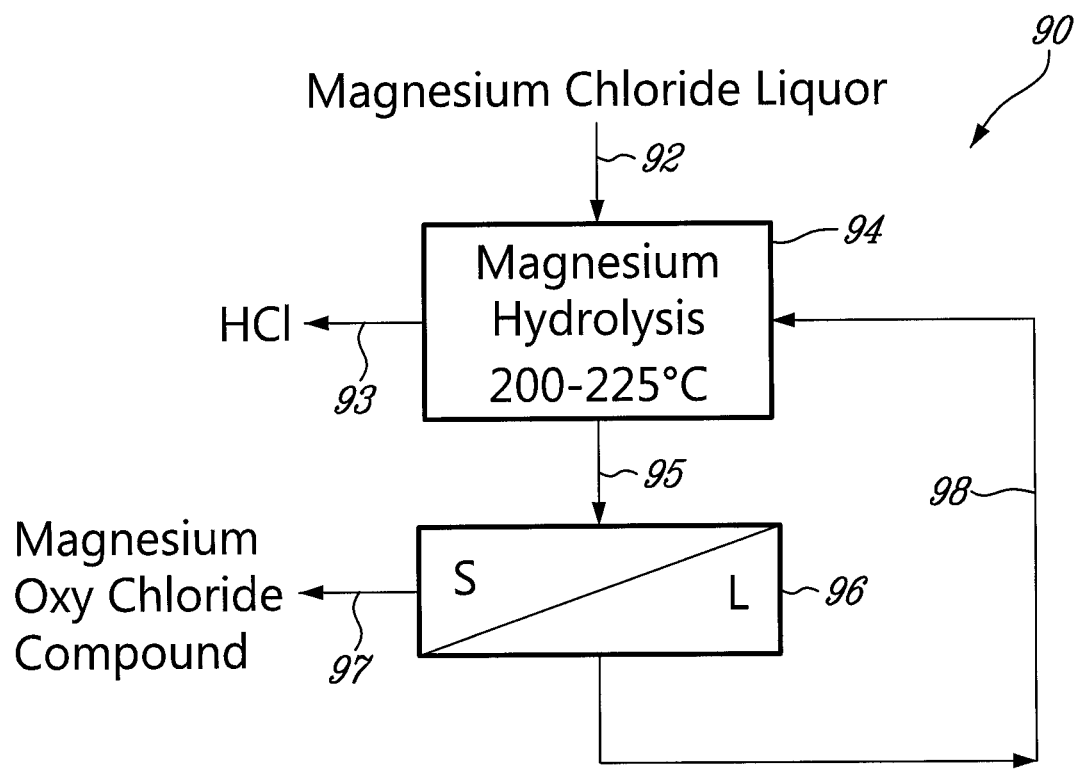
FIG. 3C is a block diagram of a method for recovering HCl and light metal from a magnesium chloride liquor, the method conducted in an inert matrix solution according to yet a further embodiment of the present invention.

Turning now to FIGS. 3A, 3B and 3C, there are shown three separate circuits 70, 80 and 90, wherein a pure base metals chloride 72, or a pure aluminum chloride 82 or a pure magnesium chloride 92 represent the feed solutions. Each of these solutions may be added/injected directly into a matrix solution at the appropriate temperature range defined earlier in this application. The chemical reactions are those present as IV, V and VI. The precipitates may be separated from the matrix solution by any suitable separation device 76, 86, 96, such as a vacuum belt filter or pressure filter. The process steps in FIG. 3A include: base metal hydrolysis 74 from the liquor 75 containing base metals (Cu, Ni, Co, Pb etc.) with HCl removal 73, followed by a base metals recovery 77, and recycle 78 of the inert matrix solution. The method steps in FIG. 3B comprising: aluminum hydrolysis 84 from the liquor 82 containing Al with HCl removal 83, followed by aluminum recovery 87 from solution 85, and a recycle 88 of the inert matrix solution. The method steps in FIG. 3C comprising: magnesium hydrolysis from the liquor 92 containing Mg with HCl 93 removal, followed by magnesium 97 recovery from solution 95, and a recycle 98 of the inert matrix solution The principles of the present invention are illustrated by the following examples, which are provided by way of illustration, but should not be taken as limiting the scope of the invention:

EXAMPLE 1

A series of boiling point tests was carried out for single and mixed chloride salt solutions with the objective of determining the point at which these solutions would freeze, since the freezing aspect is a severe drawback in the processes of Kovacs and SMS Siemag. The solutions were heated up to 225° C., or to the point where significant freezing took place. The following table shows the results of these tests.

TABLE 1

Boiling Tests on Various Chloride Salts

| Test | Regime | Comments |
| --- | --- | --- |
| 1 | $ZnCl_2$ alone | Liquid at 225° C. |
| 2 | $MgCl_2$ alone | Hydrolyzes beyond 192° C. Solid at 220° C. |
| 3 | $FeCl_3$ alone | Significant solids at 188° C.; black residue. Solid at 200° C. |
| 4 | $FeCl_3/MgCl_2/ZnCl_2$ | Slope change around 140° C. A little hydrolysis. Final solution had dark brown/black/purple residue. Remained liquid. |
| 5 | $FeCl_3/FeCl_2$ | At 201° C., significant hydrolysis, 11N (34%) HCl, remained liquid. |
| 6 | $CaCl_2$ alone | Bath froze at 175° C. |
| 7 | 30-70% base metals in $ZnCl_2$ | No significant HCl produced in condensate until 223° C. Remained liquid |
| 8 | 50-50% base metals in $ZnCl_2$ | Remained liquid. |
| 9 | 50% base metals in $FeCl_3$ | Bath started freezing at 150° C. (crust formation). |
| 10 | 70% base metals in $FeCl_3$ | Bath started freezing at 138° C. |
| 11 | $FeCl_2$ alone | Froze at 145° C. |
| 12 | $AlCl_3$ alone | Froze at 150° C. |

It is apparent from these data that zinc chloride solution is the only material tested which does not exhibit any crystallisation or hydrolysis tendencies in the temperature range up to 225° C. Furthermore, the solution remains liquid and fluid even with 50% base metals present.

The data demonstrate that any significant build-up of base metals in ferric chloride in the processes of Kovacs and SMS Siemag will result in the ferric chloride starting to crystallise and freeze, thereby necessitating to either recycle high levels of solution, or to bleed and treat the solution in another manner.

The data pertaining to magnesium show that the process of Harris and White also suffers from the same drawback, but not to the same extent.

EXAMPLE 2

The solution from test #7 in Table 1, comprising 70% zinc chloride, and 30% (copper chloride plus nickel chloride plus cobalt chloride in the ratio of 10:10:1 on a molar basis) was cooled to 180° C., and water injected. Pale blue crystals were obtained, analysing 50.6% Cu, 0.7% Ni and 0.06% Co. Zinc was not detected. This analysis is equivalent to the basic chloride $Cu(OH)_2.Cu(OH)Cl.3H_2O$, and also demonstrates that an effective separation of copper from nickel and cobalt can be achieved from the zinc chloride matrix solution.

EXAMPLE 3

A solution of 400 g/L aluminum chloride was injected into zinc chloride at 200° C. HCl of concentration 180 g/L was distilled off. At the end of the test, after 500 mL of feed solution had been injected into 1 L of zinc chloride, 96.7% of the Al fed reported to the solid phase, which analysed 41.6% Al and 0.4% Zn. XRD analysis of the precipitate showed it to be predominantly a pseudo-boehmite.

EXAMPLE 4

One litre of saturated zinc chloride solution was heated up to 165 C. 680 mL of a solution analysing 232 g/L ferric iron and 65.3 g/L Ni was injected into the zinc chloride at a rate of 8 mL/min. After the injection was finished, the test was stopped, with 137.2 g of HCl recovered 131.2 g of hematite residue. The final solution in the reactor (volume 750 mL) analysed 117 g/L Fe and 47.1 g/L Ni. The solids analysed 54.2% Fe and 14.0% Ni, but after washing with dilute HCl, there was no Ni left in the solids. This example demonstrates that iron and nickel can be successfully separated by this methodology.

Referring to FIG. 6, there is shown a perspective representation of the process reactor 1 in accordance with an embodiment of the invention. The reactor in a preferred embodiment is a column reactor, defined as tank with a height that is greater than its diameter by at least 5 times. A column reactor is distinguished from a stirred tank reactor, in that it does not have mechanical agitation. In a particularly preferred embodiment of the column reactor the liquid flow through the column reactor is downward and countercurrent to the oxygen containing gas flow upward through the column reactor. Advantages of such a column reactor include a preliminary separation of hematite solid in the direction liquid flow downward towards a solids separation apparatus. In a stirred tank reactor the solids would remain equally suspended. However, the process could be performed at lower efficiency in a stirred tank reactor as will be seen in the Examples.

Broadly speaking, the process involves the oxidation and hydrolysis of ferrous iron of the ferrous chloride solution with recovery of associated hydrochloric acid and an iron material (hematite). The embodiment of reactor 100 in FIG. 6 is shown with electrical heating coils 105 which are used to heat the reactor 100 to maintain the desired temperature of operation. The heating coils 105 can alternatively be replaced with a jacketed reactor with a thermal fluid such as steam as the heating medium.

In one embodiment of the present invention, ferrous iron is oxidized to ferric, hydrolysing the ferric iron and recovering hydrochloric acid and useful metal oxidic materials from any chloride-based feed solution. It is also understood that such processes are not limited to chloride-based solutions, but can be applied to nitrate and fluoride solutions, for example. Such solution may have been generated by treating any base or light metal-containing material with any lixiviant comprising acid and a chloride, but in particular with hydrochloric acid generated and recycled within the process, or WPL (Waste Pickle Liquor).

In accordance with one aspect of the present invention, there is provided a method for recovering hydrochloric acid and hematite from a ferrous chloride liquor comprising: providing the ferrous chloride liquor, which may optionally contain other metals such as copper, nickel, cobalt, zinc, aluminum and magnesium; adding the liquor to an oxygenated matrix solution, such matrix solution being capable of forming a hypochlorite, wherein the solution assists hydrolysis of the metal and HCl production.

In accordance with another aspect of the present invention, there is provided a method of recovering hydrochloric acid and metal from a ferrous chloride liquor wherein the improvement comprises injecting the liquor into an oxygenated matrix solution in a reaction column countercurrent to the gas flow, wherein the solution assists hydrolysis of the metal and HCl production.

It is an aspect of the invention to provide a single method which permits the oxidation and subsequent hydrolysis of ferrous iron to form hematite and hydrochloric acid. It has been discovered that this can be achieved by adding the said ferrous iron solution into an oxygenated matrix solution at 130-180° C., preferably 140-160° C., wherein the ferrous iron is oxidised and then hydrolyses and precipitates as hematite with simultaneous recovery of hydrochloric acid which distils off and is collected in an off-gas system to be recycled to the leaching stage.

In a further embodiment of the process, there is provided a column reactor, in which the oxygen gas is injected at the bottom and the ferrous iron chloride, such as might be present in a steel pickling liquor or from the leaching of a base metal sulfide ore, may be injected on its own, or simultaneously with ferric iron chloride, from the top. The weight of the liquid in column, of height 1-2 meters, and preferably 1.4-1.8 meters, holds up the oxygen gas in the column, thereby providing sufficient time for the reactions to take place. There may be a plurality of such reactors, maintained at a temperature of 109-250° C. In a specific embodiment of the invention, the first reactor is preferably at 130-170° C., and more preferably at 140-160° C.

The temperature of additional reactors in series may be raised to 170-250° C., and more preferably to 170-190° C., in order for the hematite particles to grow. It has been discovered that by maintaining temperature gradients, different particle sizes of hematite in the range 1-100 microns may be formed, thus generating hematite particles with differing color and size. Finer particles will be red in colour, whereas larger, more dense particles vary in color from purple to black.

Referring to FIG. 6, at the base or base portion 110 of the reactor 100, an oxygen containing gas such as air and/or preferably oxygen is injected through an inlet 112 into the reactor 100. In FIG. 6, the material of construction is a glass pipe 106, held together with external iron fittings 108. Clearly, any other compatible material of construction, such as PTFE (polytetrafluoroethylene) and/or PFA (polyfluorolokxy resin) and both known under the name Teflon™)

lined steel, glass lined steel, graphite, titanium alloys as well as fiberglass reinforced resin (FRP) alone or as a support for PFTE or PFA may be used and are known to the skilled person. As can be seen by FIG. 6, the reactor 100 has an aspect ratio of reactor height to diameter (in the base portion 110) of from 5:1 to 20:1.

FIG. 6 further illustrates a top or top portion 120 comprising a further sampling or injection unit 130, as well as a gas expansion zone 122. The top portion 120 further includes a ferrous chloride solution feed inlet 124, a hydrochloric acid collection outlet 125 and an optional gas outlet 126, if a second reactor is connected in series.

Figure 8:
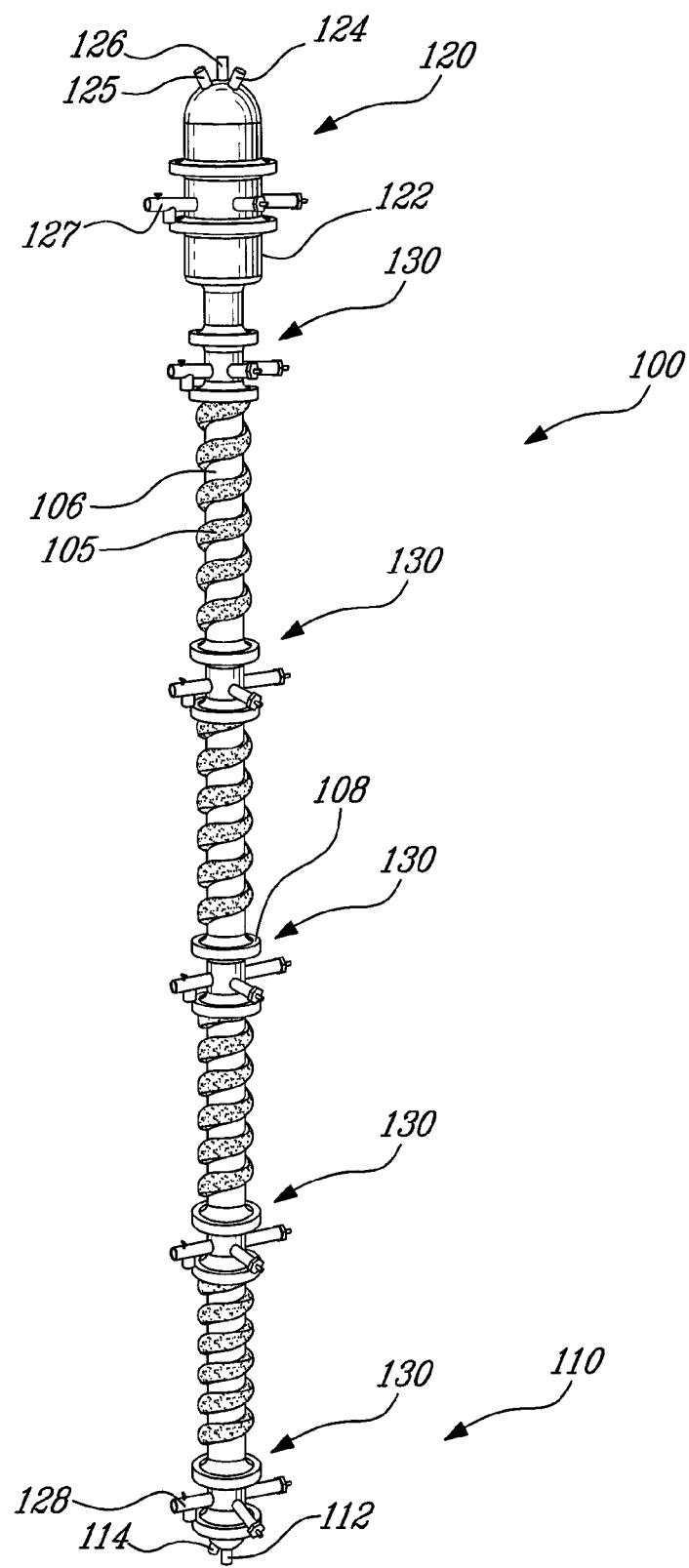
FIG. 8 is a perspective view of a sampling and injection unit portion above gas inlet ports at the base of the column reactor according to FIG. 6.

The base 110 may also include a further inlet 114 for recycled gas, where this gas comprises HCl and oxygen recycled generally from the top or top portion 120 of the reactor. The base 110 defines a first diameter and a first cross sectional area 116 (as seen in FIG. 8). The base 10 also includes an adjacent sampling and injection assembly unit 130.

The uppermost sampling and injection port 130 typically includes an inlet 127 for the circulation of the matrix solution.

The matrix solution is usually withdrawn from the bottom-most sampling and injection unit 130 via outlet 128. From outlet 128 the matrix solution including a slurry of produced hematite is pumped to a solid removal step, such as filtration.

In a specific embodiment of the invention, the first reactor 100 is preferably at 130-170° C., and more preferably at 140-160° C.

Figure 7:
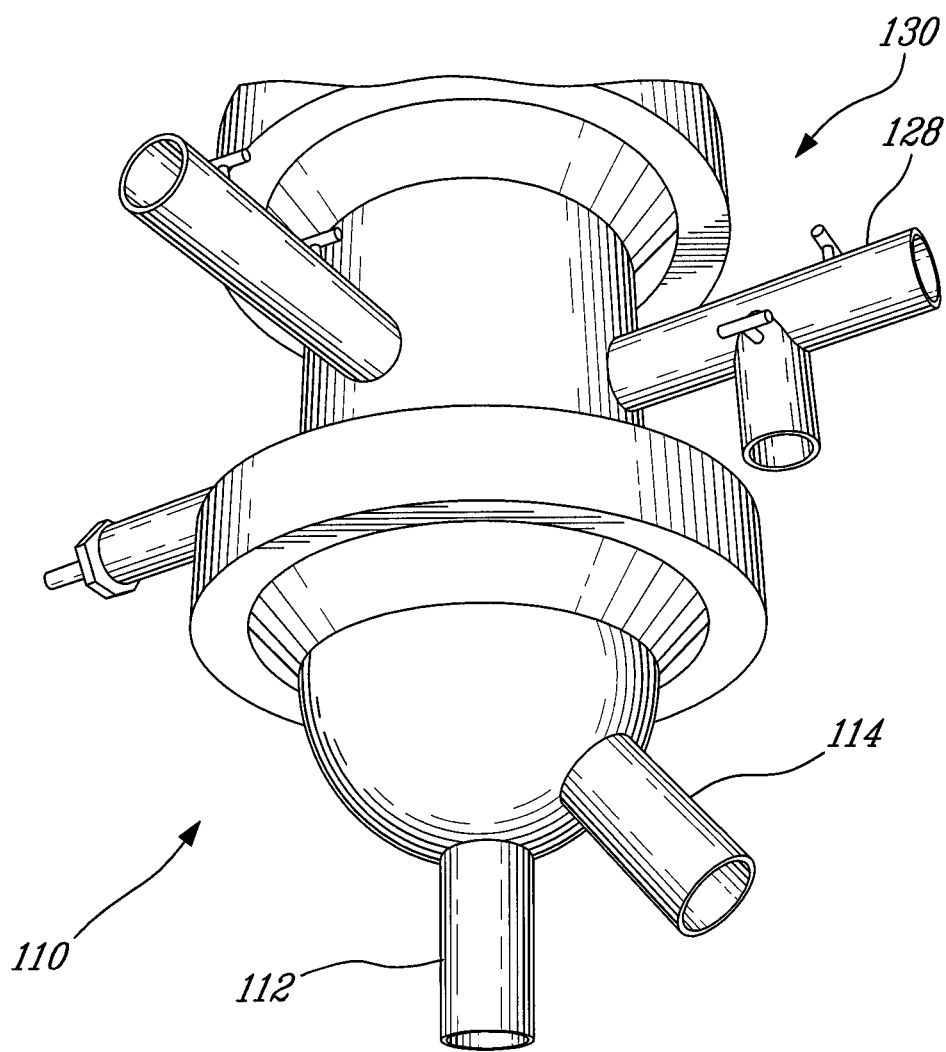
FIG. 7 is a perspective view of a base portion of the column reactor according to FIG. 6.

The oxygen sparged into the base 110 of the reactor 100, is preferred over air if concentrated hydrochloric acid (>20% by weight) is desired. The recycled gas through inlet 114 added at the base 110 of the reactor 100 increases the utilisation efficiency of the gas. FIG. 7 illustrates a detailed perspective view of a base 110 attached to an adjacent sampling and injection unit 130.

FIG. 8 shows a single sampling and injection unit 130 above the gas inlet ports 112 and 114 at the base 110 of the column reactor 100. The base portion comprises a first cross-sectional area 116 that remains substantially constant through the sampling of injection unit 130, and The unit 130 that may include a plurality of ports used for various purposes is illustrated in FIG. 8. The ports of the unit 130 include but are not limited to: injection port 131, that includes one or more injection valves 132, generally used for recycling (inlet matrix solution with or without solids): sampling ports 132 and 133 that may be in any orientation including a horizontal 133 or downwardly descending 133 orientation, each sampling port 133, and 134 respectively including valves 135 and 136 respectively. The unit 130 may also include ports for a thermocouple 137 and/or a pH/ORP (oxidation reduction potential) probe 138. The unit 130 is optionally found at a plurality of positions along the length of the reactor 100. The units 130 may be flanged together by various means.

The present reactor is meant to oxygenate the matrix solution that generates a concentration, however transient, of hypochlorite, according to the following reaction (using zinc as an example):

$$ZnCl_2+O_2 \rightarrow Zn(OCl)_2 \tag{1}$$

This reaction is favoured in the temperature range 140-160° C., and if there is relatively little associated free water present. Free water is water which is purely a solvent and is not bound in any way to the ions of the matrix compound.

As described earlier, the zinc chloride is present as a molten salt hydrate, thus satisfying these requirements.

The ferrous chloride solution may be added from the top of the reactor, such that it meets the oxygenated matrix solution countercurrently. The hypochlorite solution is a very powerful oxidant and thus highly reactive, and instantaneously reacts with the ferrous iron according to the following reaction:

$$Zn(OCl)_2+4FeCl_2+4HCl \rightarrow 4FeCl_3+ZnCl_2+2H_2O \tag{2}$$

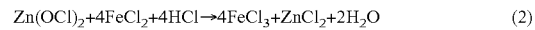

The HCl for reaction (2) is provided by reaction III (previously presented):

$$2FeCl_3+3H_2O \rightarrow Fe_2O_3+6HCl \tag{III}$$

The overall effect is thus as shown in reaction II (previously presented):

$$4FeCl_2+O_2+4H_2O \rightarrow 2Fe_2O_3+8HCl \tag{II}$$

Additional water for the reaction is provided by that associated with the incoming feed solution. The concentration of the incoming feed solution may be adjusted to give the desired strength. The Matrix reactor 100 has ports for the addition of fresh ferrous iron feed, a port for the collection of hydrochloric acid vapour, and a third port for unused oxygen gas to proceed to the next reactor.

Whilst air can be used to effect the oxidation, its use is not recommended, unless sub-azeotropic (<20% HCl) hydrochloric acid is acceptable to the overall process. This is because the large quantity of nitrogen present in air requires the addition of water to scrub the hydrochloric acid liberated into the off-gas system.

FIG. 6 shows a single reactor. However, a plurality of reactors may be used in order to give increased residence time and for a higher temperature of 170-250° C. to allow the hematite particles to grow. It can be seen in FIG. 6 that a number of sampling units 130 are provided and typically equidistantly spaced apart. These units 130 allow for the removal of hematite solids at various stages of growth if desired. It has been found that with longer residence times, larger particles are produced. Thus, it is possible to grow hematite particles of any desired size.

Turning to FIG. 8, the injection and sampling ports provided allow for reacted solution to proceed to the next reactor. Solids may be removed from these ports or from the Teflon sampling units. Alternatively, froth may overflow from the airlift at the top of the reactor. above the gas inlet ports. This assembly allows for the recycle of matrix solution, the ability to sample the reactor, and for process control instrumentation such as ORP (oxidation-reduction potential) and pH probes.

The hematite solids are separated from the matrix solution by any suitable solid-liquid separation device that may be kept hot, such as a vacuum or pressure filter. It is necessary to keep the liquid phase hot so that it does not freeze.

The use of column reactors in this manner eliminates the need for mechanical agitation, and therefore eliminates any problems associated with the choice of exotic materials of construction needed in this corrosive environment.

Figure 9:
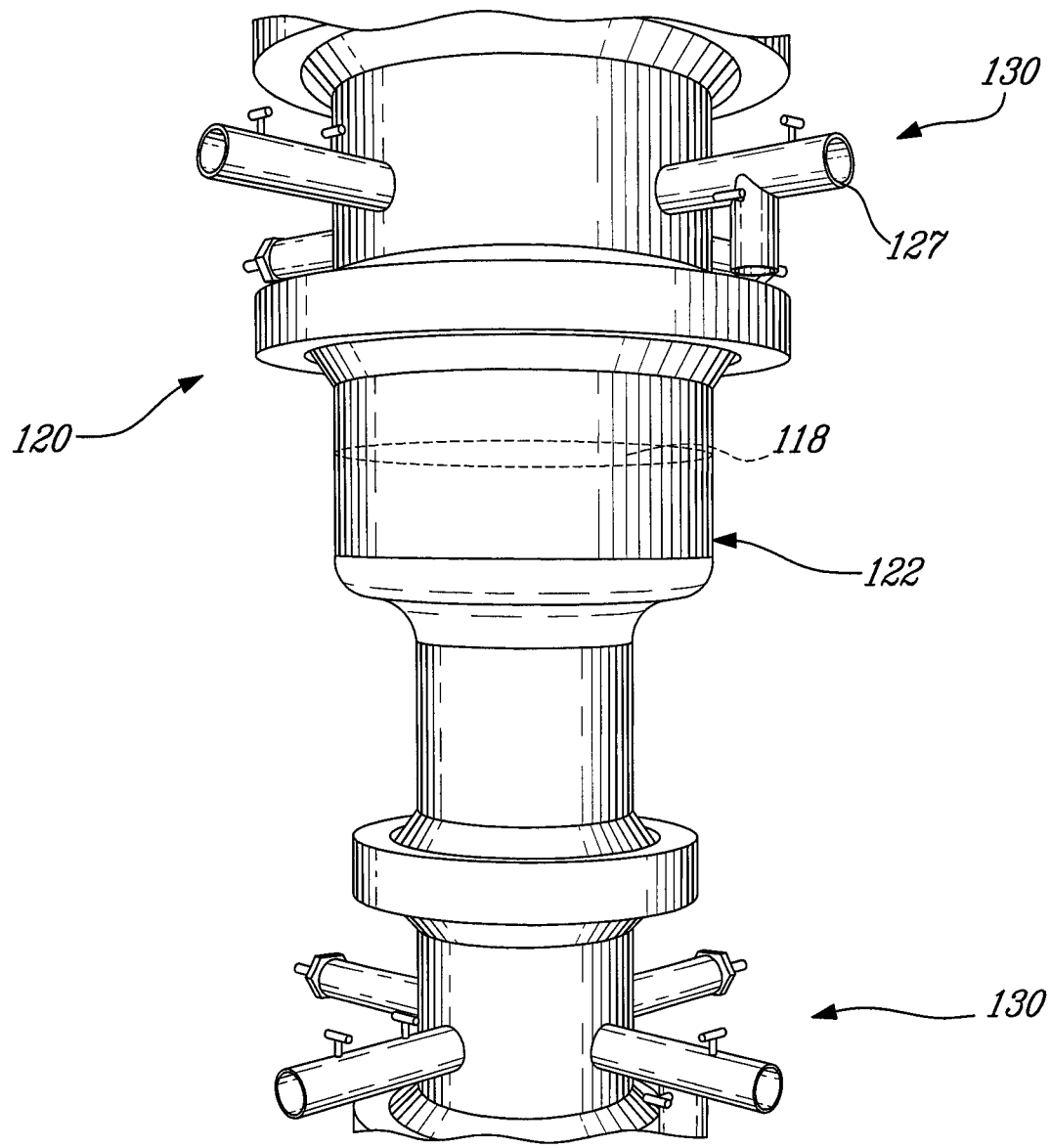
FIG. 9 is a perspective view of the gas expansion zone at a top portion of the column reactor according to FIG. 6.

As both non-consumed gas and generated hydrogen chloride (gaseous hydrochloric acid) vapor exit 125 the matrix solution, they expand, and the expansion zone 122 allows for the gases to expand without increasing the internal pressure of the reactor; and FIG. 9 discloses the gas expansion zone 122 where the cross-sectional are 116 defined through the base portion upward expands to a second cross-sectional area 118 assigned to permit the depressurization of hydrochloric acid gas produced within the reactor.

At this level of the reactor 100, there is a mixture of ferric chloride solution hydrochloric acid gas in combination with residual oxygen and possibly air, as well as matrix solution entering via inlet 127. The second surface area 118 of the expansion zone is greater than that of the first surface area of the base portion of the reactor. The ratio of second surface area to first surface area is greater than 1 and preferably in the order of 1.2:1.5 and more preferably 1.8:2.

Figure 10:
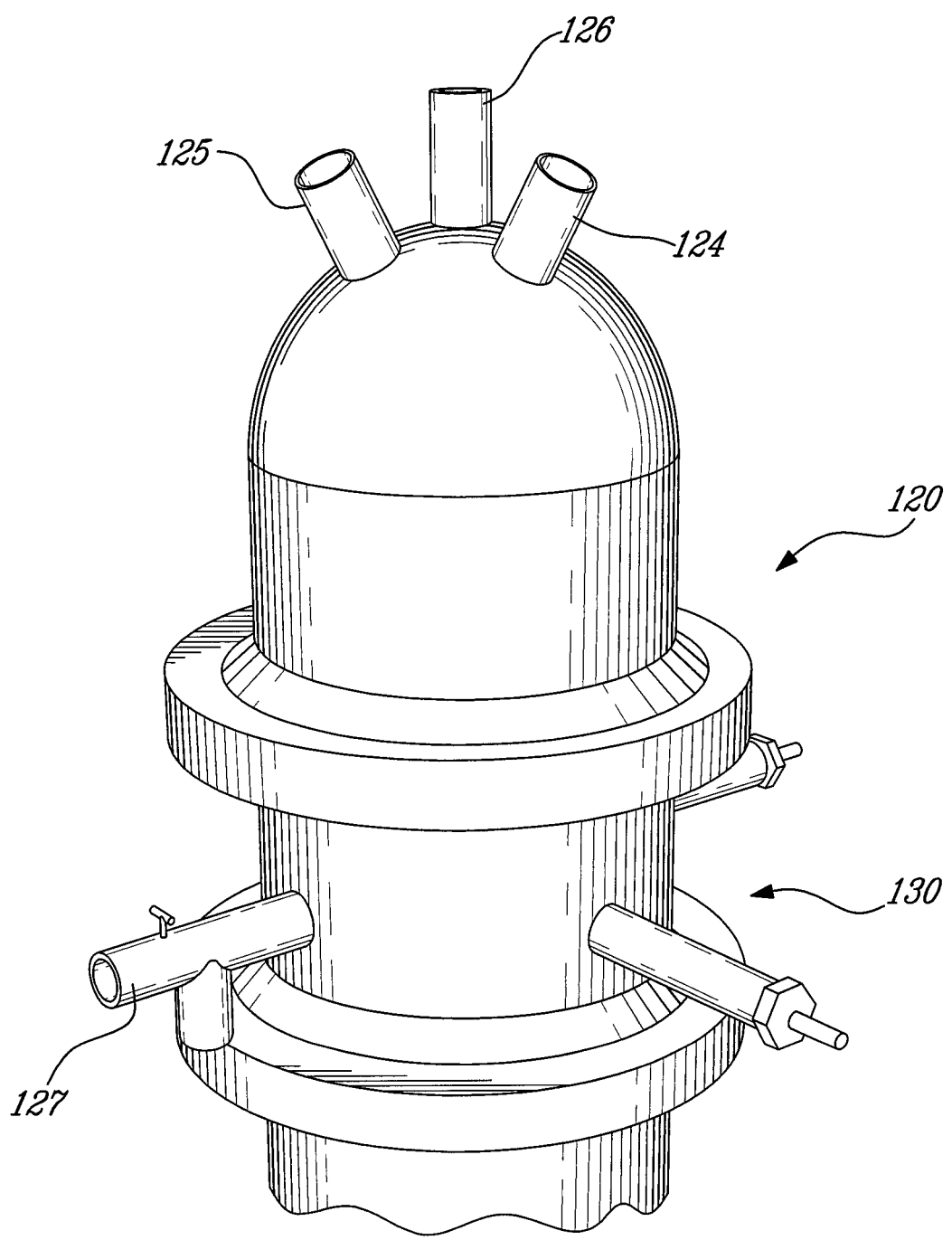
FIG. 10 is a perspective view of the top portion of the column reactor of FIG. 6.

FIG. 10 illustrates a perspective view of the top 120 of the reactor 100. In this embodiment two outlets are shown: particularly, one for the hydrochloric acid (that will be condensed) along with residue oxygen; and a second $HCl/O_2$ gas stream that could be fed into a second reactor. The top portion 120 also includes an inlet for the ferrous chloride solution and another inlet for the matrix solution (less the solids).

Figure 4:
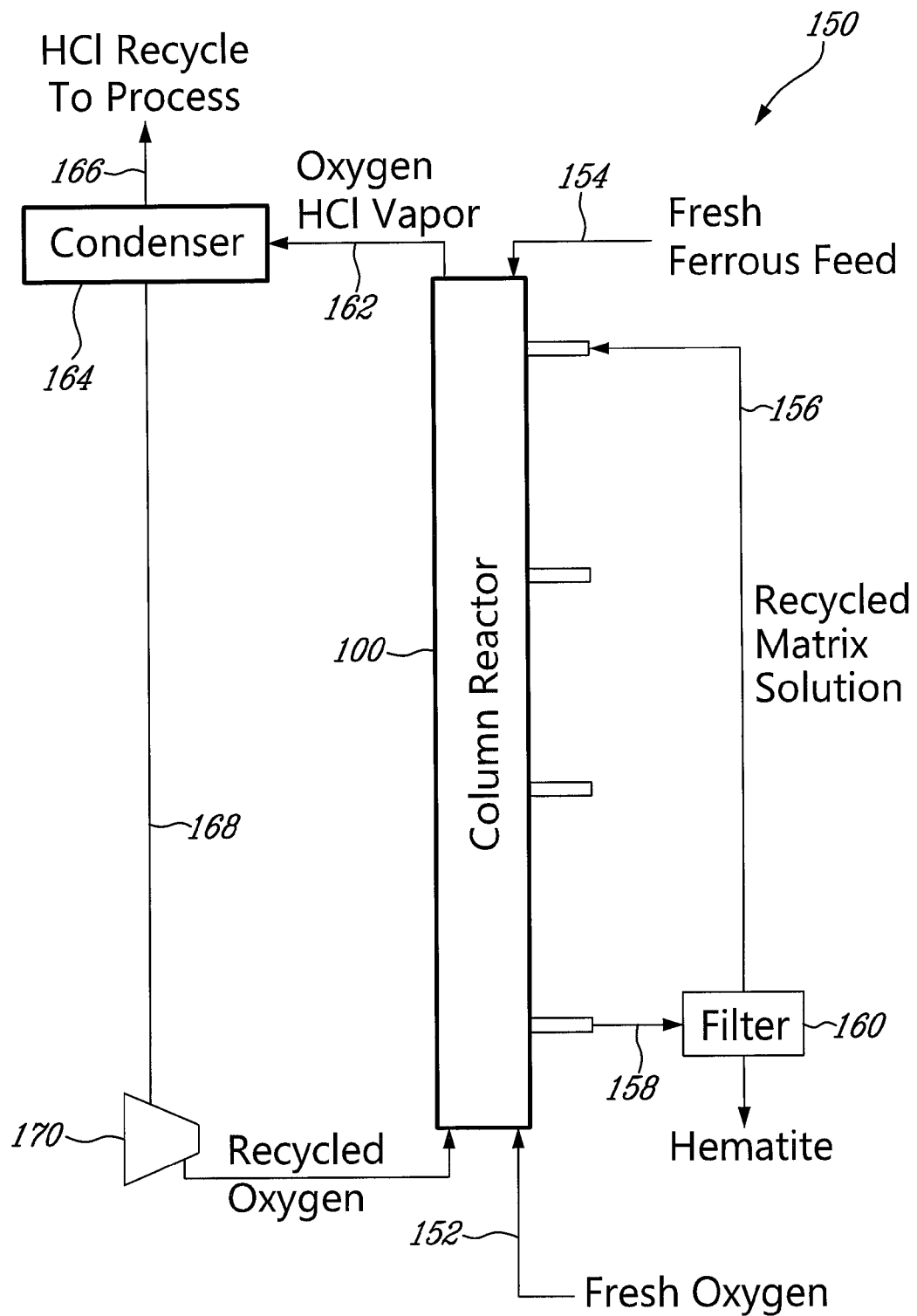
FIG. 4 is a flowsheet of operation of a single column reactor according to one embodiment of the present invention.

FIG. 4 illustrates a flow sheet 150 where a single column reactor 100 is used. In this embodiment, fresh oxygen 152 is sparged as bubbles into the bottom of the column reactor. The oxygen rises through the mixed solution in the reactor from the base and countercurrent to the fresh ferrous chloride 154 feed entering from the top. Furthermore, recycled matrix solution 156 enters at the top of the reactor also flowing countercurrent to the flow of the gases moving upward. At the bottom of the column, a recycled matrix solution 158 including suspended hematite solids is withdrawn. A filter 160 or other solid liquid separator is used to remove hematite and the now substantially solid free matrix solution 156 is returned to the top of the reactor. Although not shown, solids hematite may be seeded into the reactor to improve the precipitation reaction. A mixed stream of hydrochloric acid vapour and residual oxygen 162 enter a condenser 164 where hydrochloric acid liquid 166 is produced and possibly recycled to the process. Unreacted oxygen gas 168 is compressed in compressor 170 and recycled to the base of the column.

FIG. 5 illustrates a dual column operation 180 with two column reactors in series. FIG. 5 illustrates only one of a variety of process options that are possible. Once again, fresh oxygen 182 is sparged into the base of the downstream column reactor 176. Fresh ferrous feed 184 is fed to the top of the downstream column reactor 176. A matrix solution 186 containing hematite from column reactor 176 is seeded into upstream rector 174. Hematite in a slurry of matrix solution 188 is removed from a column 174. Hematite 190 is removed in filter 189 and solids free matrix solution 191 is typically transferred 192 partially to column 176, and partially combined 193 with hematite slurry stream 186 to produce a seeding suspension 194 for seeding of column 174. Hydrochloric acid and unused oxygen 196 are fed to a condenser 198 where once again hydrochloric acid 195 is condensed and unused oxygen 197 compressed and recycled to the base of both the upstream and downstream column reactor 174, 176.

The principles of the present invention are illustrated by the following further examples, which are provided by way of illustration, but should not be taken as limiting the scope of the invention:

EXAMPLE 5

A solution containing 1.56 kg of zinc chloride dissolved in 1.5 L of water was initially heated to 160° C., and placed equally in two columns connected in series. A mixture of air (0.2 L/min) and oxygen (0.4 L/min) was sparged into the bottom of the first column. A solution containing 144 g/L ferrous chloride was fed at a rate of 1 mL/min from the top of the first column. The two column set-up was originally intended to effect oxidation in the first and hydrolysis in the second, but it was found that both reactions took place immediately in the first column, with the overflow caused by the froth going into the second column.

Column 1 was then set to 140° C. and column 2 to 160° C. Solution was fed for 4 hours continuously into column 1, and at the end of the test, 14.7 g of black hematite was recovered from the second column, and 0.8 g of red hematite from the first column. The iron concentration at the end was 13.4 g/L in column 1 and 2.8 g/L in column 2.

This example demonstrates the simultaneous oxidation and hydrolysis of ferrous iron, and the growth of the hematite particles. No attempt to collect the HCl generated in this test was made.

EXAMPLE 6

Example 6 is provided by way of comparison with a more conventional approach using a stirred tank reactor. A similar volume of ferrous chloride solution to that used in Example 5 was saturated with zinc chloride and heated up to 190° C. in a stirred tank reactor. Oxygen gas was sparged into the reactor at the of 0.6 mL/min. After 13 hours of gas sparging, 94% of the ferrous iron had been oxidised to ferric. No HCl was recovered.

This demonstrates that in a conventional stirred tank reactor, the rate of oxidation of ferrous iron was very much slower than in a column.

EXAMPLE 7

A semi-continuous (i.e. continuous feeding of solution into reactor, but that the accumulated solids are not removed until the end of the test) acid regeneration tests to determine the behaviour of especially the alkali metals, potassium and sodium. Feed filtrate from a continuous miniplant run treating a complex gold ore was injected into a matrix of zinc chloride, maintained at 190° C., at a rate of mL/minute. A steady production of acid was achieved, demonstrating that the hydrolysis reaction occurred more or less instantaneously consistent with the feed rate. The concentration of the produced HCl was consistent at around 230-240 g/L (7M HCl), which was equivalent to the iron, aluminium and free acid concentration of the feed liquor.

Table 2 shows the analyses of the final matrix (zinc chloride) solution, the composition of the solids produced, and the distribution of the elements between solids and solution. It is clear that the solids were comprised of primarily of iron and aluminium, with virtually all of the iron reporting to the solids. Potassium (and by inference sodium) and calcium all reported entirely to the matrix solution, as was anticipated. At 190° C., virtually no magnesium was found in the solids. Arsenic in the feed solution reported one third to the final solids, with the balance being distilled as a chloride and collected in the recovered acid.

TABLE 2

Matrix and Solids Analyses from Acid Regeneration Test at 190° C.

| Element | Feed, g/L (mg/L) | Final Matrix g/L (mg/L) | Solids Analysis % | Distribution, % | |
|---|---|---|---|---|---|
| | | | | Matrix | Solids |
| Al | 19.0 | 5.41 | 17.0 | 10.2 | 89.8 |
| As | (401) | (2.4) | 0.16 | 0.1 | 34.9 |
| Ca | 6.05 | 13.7 | 0.10 | 98.3 | 1.7 |
| Fe | 34.2 | (45) | 34.1 | 99.5 | 0.5 |
| K | 10.2 | 32.6 | ND | 100 | 0 |

TABLE 2-continued

Matrix and Solids Analyses from
Acid Regeneration Test at 190° C.

| Element | Feed, g/L (mg/L) | Final Matrix g/L (mg/L) | Solids Analysis % | Distribution, % Matrix | Distribution, % Solids |
|---|---|---|---|---|---|
| Mg | 13.7 | 35.4 | 0.08 | 99.3 | 0.7 |
| Mn | (456) | 1.34 | ND | 100 | 0 |

The invention claimed is:

1. A method for recovering hydrochloric acid and metal from a chloride liquor, the method comprising the steps of:
providing the chloride liquor comprising the metal;
mixing the chloride liquor and a matrix solution comprising $ZnCl_2$ to produce a reaction mixture; and
mixing an oxygen containing gas into the reaction mixture;
wherein the matrix solution assists hydrolysis of the metal with HCl production.

2. The method according to claim 1, further comprising the step of recovering hydrolyzed metal from the reaction mixture using a solid/liquid separator.

3. The method according to claim 1, wherein the chloride liquor further comprises base and light metals and the method further comprising the step of removing the base metal from the reaction mixture.

4. A method of recovering hydrochloric acid and metal from a chloride liquor, the method comprising the steps of:
injecting the chloride liquor into a matrix solution comprising $ZnCl_2$ to produce a reaction mixture; and
injecting an oxygen containing gas into the reaction mixture;
wherein the solution assists hydrolysis of the metal in the reaction mixture and produces HCl.

5. A method for recovering hydrochloric acid and metal oxide from a metal containing chloride liquor, the method comprising the steps of:
mixing the chloride liquor and a matrix solution comprising $ZnCl_2$ to produce a reaction mixture; and
injecting an oxygen containing gas into the reaction mixture;
wherein the matrix solution assists hydrolysis and oxidation of the metal with HCl production.

6. A reactor for recovering hydrochloric acid and metal from a chloride-based feed solution, the reactor comprising:
a tank compatible with a mixture comprising the metal chloride solution, a matrix solution, an oxygen containing gas and a solid comprising a metal oxide, the tank comprising:
a base,
the base defining a first diameter and a first cross sectional area, the base comprising a metal oxide slurry outlet, a matrix solution outlet and a gas inlet located adjacent a bottom region of the base;
a top opposite the base,
the top comprising a metal chloride solution feed inlet, a hydrochloric acid outlet, a matrix solution inlet, the top defining a gas expansion zone having a second cross sectional area and,
a wall attached to the top and the base defining a volume and a height of the tank;
wherein the oxygen containing gas injected at the gas inlet raises through the mixture contained in the tank;
wherein a ratio of the second cross sectional area to the first cross sectional area is greater than 1 and whereby hydrochloric acid leaves the mixture as a hydrochloric acid containing gas in the gas expansion zone at the top of the tank.

7. The reactor of claim 6, wherein the reactor is a column reactor.

8. The reactor of claim 6, comprising a ratio of the height to the first diameter from 5:1 to 20:1.

9. A process for recovering hydrochloric acid and metal from a chloride-based feed solution, the process comprising:
providing a ferrous chloride solution;
mixing the ferrous chloride solution and a matrix solution together to produce a mixture, wherein the matrix solution comprises $ZnCl_2$;
injecting an oxygen containing gas into the mixture, to oxygenate the matrix; and
recovering oxidized or hydrolyzed ferrous iron and hydrochloric acid.

10. The method according to claim 3, wherein the step of removing the base metal includes hydrolyzing the base metal and removing the hydrolyzed base metal from the reaction mixture in a filtration step.

11. The process according to claim 9, wherein the step of recovering oxidized or hydrolyzed ferrous iron and hydrochloric acid includes producing a mixture containing the oxidized or hydrolyzed ferrous iron and hydrochloric acid.

* * * * *